United States Patent [19]

Hanabata et al.

[11] Patent Number: 4,826,902

[45] Date of Patent: May 2, 1989

[54] COATING COMPOSITION WITH IMPROVED RUST-PREVENTING PROPERTIES FOR USE IN PREPARING LUBRICATED STEEL PRODUCTS

[75] Inventors: Hiroki Hanabata, Ibaragi; Hideo Kawaguchi, Narashino; Hiroshi Fukudome, Ibaragi; Ryoichi Noumi, Minoo; Hiromi Izaiku, Kamakura; Koichi Komai, Fujisawa; Kisuke Yoshida, Kawasaki, all of Japan

[73] Assignees: Nippon Oil & Fats Co., Ltd., Tokyo; Sumitomo Metal Industries, Ltd., Osaka, both of Japan

[21] Appl. No.: 167,098

[22] Filed: Mar. 11, 1988

[30] Foreign Application Priority Data

Mar. 12, 1987 [JP] Japan .................................. 62-057791

[51] Int. Cl.$^4$ ........................... C08K 5/44; C08K 5/18
[52] U.S. Cl. ...................................... 524/168; 524/96; 524/99; 524/100; 524/169
[58] Field of Search .................. 524/99, 100, 168, 169

[56] References Cited

U.S. PATENT DOCUMENTS 3,568,486  3/1971  Rosenberg ............................. 72/42
4,432,851  2/1984  Matsuo et al. ...................... 204/181

FOREIGN PATENT DOCUMENTS 103995  5/1986  Japan .

OTHER PUBLICATIONS

Information on "Hostacor H", (arylsufonamidocarboxylic acid), Sep. 1978.

Primary Examiner—John C. Bleutge
Assistant Examiner—David W. Woodward
Attorney, Agent, or Firm—Burns, Doane, Swecker & Mathis

[57] ABSTRACT

A coating composition based on an acrylic resin which is useful for preparing lubricated steel products such as steel sheets or tubes is disclosed. The coating composition contains as additives a rust preventive which is a mixture of a sulfonamidecarboxylic acid and an cyclic amine and a water repellent. It exhibits improved rust-preventing properties when lubricated steel products having a coating film formed from the coating composition are stored for a prolonged period under coiled or stacked conditions.

5 Claims, No Drawings

COATING COMPOSITION WITH IMPROVED RUST-PREVENTING PROPERTIES FOR USE IN PREPARING LUBRICATED STEEL PRODUCTS

BACKGROUND OF THE INVENTION

1. Field of the Invention

The present invention relates to a coating composition for lubrication of steel products on which pressing or similar working (stamping, etc.) is later performed, i.e., steel products for use in press working. More particularly, it relates to such a coating composition which is useful for preparing lubricated steel products and which exhibits improved rust-preventing properties, particularly when the lubricated steel products are coiled or stacked during storage and transportation.

Steel products for use in press working include steel sheets, for example, hot rolled pickled steel sheets, cold rolled steel sheets, plated steel sheets such as galvanized steel sheets, and stainless steel sheets, as well as steel tubes or pipes and similar shaped steel products.

2. Prior Art

When a steel sheet or tube is subjected to pressing, a lubricating oil which comprises a mineral and/or vegetable base oil and various additives has commonly been employed for many years. Such a lubricating oil is applied to the surface of the steel product to be worked prior to pressing by the user such as the operator of the press machine. In order to eliminate environmental problems encountered in the handling of the lubricating oil by a user, it is the recent trend for steel sheets and tubes to be previously coated with a lubricating organic dry film containing various lubricants. The lubricating coating is provided at an appropriate stage after the steel products are manufactured and before they are sold to users. The use of such steel sheets and pipes having a previously-formed lubricating dry coating film on the surfaces thereof (hereinafter referred to collectively as "lubricated steel products") is steadily increasing.

The coating compositions useful for forming lubricating dry films in the preparation of lubricated steel products are comprised predominantly of a film-forming resin of the drying type or bake-curing type such as an acrylic resin, epoxy resin, melamine resin, or phenolic resin, and they further contain as a lubricant one or more of a fatty acid, fatty ester, fatty acid soap, metallic soap, alcohol, polyethylene fine powder, graphite, molybdenum disulfide, fluorinated resin fine powder, and the like. These coating compositions are disclosed in Japanese Patent Laid-Open Applications Nos. 60-250099(1985), 59-204668(1984), and 57-65795(1982).

For the purpose of actual use, it is desirable that a coating composition for use in preparing lubricated steel products form a dry coating film having the following properties:

(a) lubricity which is required when the lubricated steel products are press-worked;
(b) rust-preventing properties after the preparation of the lubricated steel products and before they are degreased after press working;
(c) film removability with a degreasing solution; and
(d) anti-block or non-sticking properties while the lubricated steel products are coiled or stacked.

Most of the above-mentioned various prior art coating compositions have formulations designed so as to improve the press-formability (lubricity) of the resulting dry coating films at the expense of rust-preventing properties. In fact, lubricated steel products coated with a prior art coating composition frequently suffer from troubles due to rusting during actual use, particularly when they are coiled or stacked during storage. Accordingly, there is still a need for a coating composition suitable for use in preparing lubricated steel products whch has improved rust-preventing properties.

SUMMARY OF THE INVENTION

It is an object of the present invention to provide a coating composition which is useful in the preparation of lubricated steel products and which has improved rust-preventing properties in addition to good lubricity.

It is another object of the present invention to provide a coating composition for use in preparing lubricated steel products which can form on steel surfaces a coating film having good lubricity, film removability, anti-block properties, and improved rust-preventing properties Other objects and advantages of the present invention will be apparent from the following description and examples.

Upon investigation of the rusting phenomenon frequently observed with the prior art lubricated steel products, we have found that rust formation is attributable to the following mechanism. When lubricated steel sheets or tubes are coiled or stacked, water vapor in the atmosphere is condensed in the spaces between adjacent steel sheets or tubes and the lubricating films of the steel products in these spaces tend to be damaged by the action of the condensed water under the load of the steel sheets or tubes coming thereon. If the lubricated film is damaged, rust formation of the lubricated steel products is also accelerated by an electrochemical reaction in the presence of water.

Thus, in order to prevent lubricated steel products from rusting, particularly under coiled or stacked conditions, it is necessary to prevent rusting caused by the above mechanism, and it is not always effective for this purpose to merely protect the steel surfaces with an organic lubricating film as a barrier between the steel surfaces and the atmosphere.

It has been found that the above objects can be accomplished by a coating composition which comprises an acrylic resin having particular properties as a base resin and a certain rust-preventive agent and a water repellent. It is believed that the coating composition of the present invention can effectively prevent steel products from rusting by the above mechanism.

In one aspect, the present invention provides a coating composition with improved rust-preventing properties suitable for use in preparing lubricated steel products, which comprises from 75 to 97.7% by weight of an acrylic resin having an acid value of from 20 to 160 and a glass transition temperature of from 5° to 100° C.; from 0.3 to 5% by weight of a mixture of a sulfonamidecarboxylic acid and a cyclic amine as a rust preventive; and from 2 to 20% by weight of a water repellent based on the total solids content of the composition.

The coating composition according to the present invention may further contain one or more additional components in minor amounts, e.g., in a total amount of up to 20% by weight based on the total solids content of the composition, as described below.

In another aspect, the present invention provides a lubricated steel product such as a steel sheet or tube which has a dry film formed from the above coating composition on at least one surface thereof.

DESCRIPTION OF THE PREFERRED EMBODIMENTS

When the proportion of the rust preventive used in the present invention which is a mixture of a sulfonamidecarboxylic acid and a cyclic amine is less than 0.3% by weight, the resulting coating composition will not form a film having adequate rust-preventing properties. Similarly, when the proportion of the rust preventive exceeds 5% by weight, the rust-preventing properties will be decreased. Thus, the rust preventive comprises from 0.3 to 5% by weight, and preferably from 0.5 to 3% by weight of the total solids content of the coposition.

When the proportion of the water repellent is less than 2% by weight, the coating film formed from the composition will not possess adequate water repellency. On the other hand, incorporation of a water repellent in a proportion of greater than 20% by weight will provide no further increase in water repellency of the coating film so that it is disadvantageous from a viewpoint of economy. Thus, the water repellent comprises from 2 to 20% by weight, and preferably from 3 to 15% by weight of the total solids content of the composition.

The acrylic resin comprises the balance of the coating composition, and it constitutes from 75 to 97.7% by weight, and preferably from 82 to 96.5% by weight of the total solids content of the composition.

The acrylic resin useful in the coating composition of the present invention has an acid value (acid number) of from 20 to 160, preferably from 40 to 120, and more preferably from 50 to 100, and a glass transition temperature of from 5° to 100° C., and preferably from 10° to 85° C.

If the acid value of the acrylic resin is less than 20, the resulting coating composition will not have satisfactory film removability when an alkaline degreasing solution is used. Film removability is required to process the pressed steel products in a subsequent step such as painting. Use of an acrylic resin having an acid value of greater than 160 results in a significant decrease in the rust-preventing properties of the resulting coating film. The acid value of an acrylic resin can be varied by the concentration of an acid monomer used in the preparation of the resin.

When the glass transition temperature (Tg) of the acrylic resin is lower than 5° C., the cohesiveness of the resin is too high and dry films of the resulting coating composition will not possess satisfactory anti-block properties. On the other hand, when it is higher than 100° C., the film forming properties of the resin are deteriorated, resulting in a decrease in the rust-preventing properties of the coating, and the film removability of the composition is also decreased. The glass transition temperature of the acrylic resin depends on the composition and molecular weight of the polymer.

The acrylic resin used in the present invention may be any thermoplastic acrylic resin which is commonly employed in various coating compositions and it may be prepared by any conventional polymerization method, for example, the solution or emulsion polymerization method. Such acrylic resins and their preparation are well known to those skilled in the art.

The acrylic resin is typically prepared by polymerization of one or more monomers, usually at least two monomers selected from alpha,beta-ethylenically unsaturated carboxylic acids and their esters with an alcohol having 1 to 25 carbon atoms.

Specific examples of useful monomers include acrylic acid, methacrylic acid, sorbic acid, itaconic acid, maleic acid, fumaric acid, methyl (meth)acrylate [the expression "(meth)acrylate" indicating acrylate or methacrylate], ethyl (meth)acrylate, propyl (meth)acrylate, isopropyl (meth)acrylate, butyl (meth)acrylate, isobutyl (meth)acrylate, 2-ethylhexyl (meth)acrylate, hexyl (meth)acrylate, lauryl (meth)acrylate, stearyl (meth)acrylate, 2-hydroxyethyl (meth)acrylate, 2-hydroxypropyl (meth)acrylate, glycidyl (meth)acrylate, and dimethylaminoethyl (meth)acrylate.

Since the acrylic resin used in the present invention has an acid value of from 20 to 160, at least one free acid monomer and at least one ester monomer selected from alpha,beta-ethylenically unsaturated carboxylic acids and their esters are generally used in such proportions that the resulting acrylic resin has a desired acid value. As described above, the glass transition temperature of an acrylic resin may be varied depending on the composition and molecular weight of the resin. Therefore, it is also necessary to select the monomers and degree of polymerization so as to form an acrylic resin having a desired Tg. If desired, a blend of two or more acrylic resins may be employed in the coating composition. In this case, it is not always necessary that each of the individual acrylic monomers has an acid value and Tg within the above-mentioned respective ranges as long as the acid value and Tg of the blend fall within the respective ranges. Usually the number-average molecular weight of the acrylic resin useful in the present invention ranges from 5,000 to 1,000,000, and preferably from 10,000 to 500,000.

The acrylic resin may be partially or completely neutralized with ammonia or an amine in order to enhance the stability of the resulting coating composition.

The rust preventive used in the coating composition is a combination of a sulfonamidecarboxylic acid and a cyclic amine. Preferably a cyclic amine is used in an amount of from 0.5 to 2.5 equivalent weights and more preferably from 0.8 to 1.2 equivalent weights for each equivalent weight of a sulfonamidecarboxylic acid. Optionally one or more additional rust preventives selected from conventional ones, e.g., oleoyl sarcosine, may be used.

When present in solution, a sulfonamidecarboxylic acid and a cyclic amine react to form a salt. As indicated above, however, it is not always necessary to use these two ingredients in equivalent amounts, and either one of them may be present in stoichiometrically excess.

Examples of the sulfonamidecarboxylic acid are compounds of the formula:

where R is a saturated or unsaturated aliphatic, cycloaliphatic, or aromatic hydrocarbon group, and n is an integer from 1 to 7.

Specific examples of the above compounds include methylsulfonamidecarboxylic acid, ethylsulfonamidecarboxylic acid, propylsulfonamidecarboxylic acid, allylsulfonamidecarboxylic acid, butylsulfonamidecarboxylic acid, benzenesulfonamidecarboxylic acid, benzylsulfonamidecarboxylic acid, nonylphenylsulfonamidecarboxylic acid, octylphenylsulfonamidecarboxylic acid, and the like. Some of these compounds are sold in the form of free acids or salts under the tradename Bohrmittel HOECHST and Hostacor H from HOECHST (Hostacor is a registered trademark). The sulfonamidecarboxylic acid may be used as a free acid or its salt with an alkali metal or an amine.

The cyclic amine is a heterocyclic compound containing one or more ring nitrogen atoms, preferably in a six-membered ring. Examples of the cyclic amine are pyrazine, pyridine, piperidine, piperazine, morpholine, and derivatives of these. Specific examples of the cyclic amine include pyridine, methylpyridine, dimethylpyridine, ethylpyridine, propylpyridine, cyanopyridine, aminopyridine, aminomethylpyridine, piperidine, N-methylpiperidine, methylpiperidine, dimethylpiperidine, N-ethylpiperidine, ethylpiperidine, pyperazine, morpholine, N-methylmorpholine, N-aminoethylmorpholine, N-aminopropylmorpholine, pyrazine, methylpyrazine, dimethylpyrazine, and the like.

As the water repellent, any conventional water repellent may be used in the present coating composition as long as it does not adversely affect the film-forming properties of the acrylic resin or the effect of the rust preventive. Suitable for this purpose are water-repelling materials such as carboxylic acid esters, metallic soaps, polyethylene fine powder, and fluorinated resin fine powder.

The carboxylic acid esters useful as a water repellent in the present coating composition include esters of an aliphatic or aromatic saturated monocarboxylic acid, and preferably esters of an aliphatic or aromatic saturated polyfunctional carboxylic acid such as a di- or tricarboxylic acid. Specific examples of these carboxylic acid esters are butyl stearate, di-2-ethylhexyl phthalate, diheptyl phthalate, di-n-octyl phthalate, dinonyl phthalate, diisodecyl phthalate, ditridecyl phthalate, di-2-ethylhexyl adipate, di-2-ethylhexyl sebacate, trioctyl trimellitate, ethylene glycol distearate, glycerol tricaprylate, and trimethylolpropane tristearate.

The metallic soaps include aluminum stearate, calcium stearate, zinc stearate, and magnesium stearate.

Examples of fluorinated resins are polytetrafluoroethylene resins.

Although all the above-listed water repellents are known to have a lubricating effect, other water repellents having no or little lubricating effect may be used in the present invention.

Optionally the coating composition of the present invention may further contain other conventional additives such as an extreme-pressure additive, a preservative, a pigment, an additional rust preventive, and a lubricant in minor amounts. When employed, these optional additives are usually added in a total amount of not greater than 20% by weight of the coating composition.

The coating composition may be prepared by simply mixing the acrylic resin, rust preventive, water repellent, and optional additives, if any, at ambient temperature. Water or an organic solvent may be added as a diluent or vehicle. When the acrylic resin is in the form of an aqueous solution or emulsion prepared by the solution or emulsion polymerization method, the coating composition may be prepared by adding the other components to the solution or emulsion of the acrylic resin. If necessary, the coating composition may be diluted with water or an organic solvent so as to have a consistency suitable for application by the coating technique employed.

In the preparation of lubricated steel products, the coating composition of the present invention may be applied to at least one surface of the steel products by a conventional coating technique such as dipping, roll coating, curtain coating, spray coating, electrostatic coating, or electrodeposition coating. After application, the wet coating is then dried by hot air or by irradiation with actinic radiation to give a dry lubricating film on the surfaces of the steel products, thereby obtaining the desired lubricated steel products.

The lubricated steel products of the present invention preferably have a dry film of the coating composition with a coating weight (as a dry film) in the range of from 0.2 to 6.0 $g/m^2$ and more preferably from 0.5 to 3.0 $g/m^2$. With a coating weight of less than 0.2 $g/m^2$, the lubricated steel products will not have adequate lubricity and rust-preventing properties. When the coating weight is greater than 6.0 $g/m^2$, there is no significant improvement in lubricity or rust-preventing properties.

With the lubricated steel products of the present invention, the rust preventive (sulfonamide carboxylic acid + cyclic amine) and the water repellent are firmly retained in the acrylic resin coating film formed on the surfaces of the steel products. The coating film has satisfactory lubricity when the steel products are subjected to pressing. The lubricity is attributable for the most part to the acrylic resin film itself. The presence of the water repellent in the coating film generally further improves the lubricity.

In the lubricated steel products of the present invention, the above-mentioned good lubricity required for press working is obtained without deteriorating other requisite properties such as rust-preventing properties after the preparation of lubricated steel products and before removal of the coating film with a degreasing solution after press working, film removability with an alkaline degreasing solution, and anti-block properties. The rust-preventing properties of the lubricated steel products are maintained even when they are coiled or stacked. Therefore, the lubricated steel products can be effectively prevented from rusting throughout all the stages between the preparation of the lubricated steel products and removal of the lubricating film, which include storage, transportation, and press working of the lubricated steel products. In contrast, with prior art lubricated steel products, the rust-preventing properties tend to significantly deteriorate under stacked conditions, such as during storage and transportation. With the lubricated steel products of the present invention, the rust-preventing properties under stacked conditions are attained by the synergistic effect of the acrylic resin and the additives (the rust-preventing agent and water repellent), and these properties will be at least partially lost when one of these additives is not present in the lubricating coating film or the acrylic resin has an acid value or Tg which falls outside the range defined herein.

The present invention will be described in more detail by the following examples. It should be understood, however, that the present invention is not restricted to these examples, since they are given merely for the purpose of illustration.

EXAMPLES

Various acrylic resins were prepared according to the conventional emulsion polymerization method from monomers selected from acrylic acid (AA), methacrylic acid (MAA), methyl methacrylate (MMA), octyl acrylate (OA), butyl acrylate (BA), and 2-ethylhexyl methacrylate (EHMA). The proportions of these monomers were as indicated in Table 1 below, and the acid value (AV), glass transition temperature (Tg), and number-average molecular weight ($\overline{Mn}$) of the resulting acrylic resins are also included in Table 1.

To the resulting acrylic resins in the form of aqueous emulsion, a water repellent (carboxylic acid salt or ester) and a rust preventive (a mixture of a sulfonamidecarboxylic acid and a cyclic amine) were added and stirred thoroughly, and if necessary, the mixtures were diluted with water to give coating compositions. The acrylic resin and additives used in each coating composition are shown in Table 2 below. Each of the coating compositions contained the individual components in the following proportions (the percents in parentheses indicating the proportions of the water-free basis, i.e., based on the total solids content) and its pH was adjusted to 8.0 with triethylamine.

| Component | Percent by weight | |
|---|---|---|
| Acrylic resin | 22.5% | (90.0%) |
| Water repellent | 2.0% | (8.0%) |
| Rust preventive | 0.5% | (2.0%) |
| Water | Balance | |

Some coating compositions shown in Table 2 contained no water repellent or rust preventive for comparison, and in such cases additional water was added in an amount equal to the weight of the water repellent or rust preventive which was omitted.

Each of the resulting coating compositions was applied to a 0.8 mm-thick cold rolled steel sheet which had been treated with a degreasing solution to make the surface clean. The application of the coating composition was carried out by using a bar coater to a thickness sufficient to give a dry coating weight of 3 g/m². The applied coating was dried in hot air at 110° C. for 10 minutes to give a lubricated steel sheet having a dry lubricating film on one surface.

The lubricated steel sheet was evaluated with respect to cupping drawability as an indication of lubricity, film removability with a degreasing solution, anti-block properties, and rust-preventing properties under stacked conditions and under conditions of exposure to air or a moist atmosphere according to the following testing procedures.

[Testing procedures]

(1) Cupping drawability

According to the conventional cupping test procedure, blanks of the lubricated steel sheet with increasingly larger diameters were drawn with the lubricated surface facing a die by using a punch having a diameter of 33.0 mm at a pressure of 1,000 kg/cm² into cylindrical, flat-bottomed cups to determine the maximum blank diameter, which is the maximum blank size which can be drawn successfully without fracturing. The limiting drawing ratio (LDR) of the lubricated steel sheet was calculated by the following equation:

$$LDR = \frac{\text{maximum blank diameter}}{\text{punch diameter}}.$$

The LDR of the cold rolled steel sheet having no lubricating coating film (unlubricated steel sheet) was determined in the same manner. The cupping drawability was evaluated by the ratio of the LDR of the lubricated steel sheet (A) to that of the unlubricated steel sheet (B) and rated as follows:

X: A/B<1.0;
Δ: A/B=1.0–1.1;
O: A/B>1.1.

A/B=LDR of lubricated sheet/LDR of unlubricated sheet.

(2) Film removability

A 2% aqueous solution of Fine Cleaner FC 4326 (Fine Cleaner is a registered trademark of Nippon Parkerizing Corp. Ltd.) at a temperature of 60°–70° C. was sprayed onto the lubricated surface of a test piece of the lubricated steel sheet for 5 seconds at a spray pressure of 1 kg/cm² to degrease and clean the surface. The film removability was evaluated by the degree of water repellency of the thus-treated surface and rated as follows:

X: water repellency observed throughout the surface;
Δ: water repellency observed partially on the surface;
O: no water repellency observed.

(3) Anti-lock properties

Two test pieces of the lubricated steel sheet each having a size of 70 mm×150 mm were superposed with the lubricating coating films thereon facing each other. The superposed test pieces were aged for 1 minute at a temperature of 50° C. under a load of 67 kg/cm², then for 16 hours at a temperature of 40° C. under a light load of 500 g/m², and finally for 50 days at room temperature under no load. Thereafter the two pieces were removed while the degree of blocking of the lubricating coating films on the test pieces was observed. The anti-block properties were rated as follows:

X: Significant blocking observed;
Δ: Slight blocking observed;
O: No blocking observed.

(4) Rust-preventing properties 4-1 Under stacked conditions

Two test pieces of the lubricated steel sheet each having a size of 70 mm×150 mm were superposed with the lubricating coating films thereon facing each other after a commercially-available rust-preventive oil was applied to the lubricated surface, i.e., on the lubricating coating film of each test piece at a weight of 0.5 g/m². A drop of water was present between the superposed test pieces. The superposed test pieces were aged for 24 hours at a temperature of 50° C. under a load of 50 kg/cm².

4-2 Under exposure to air

A test piece having a size of 70 mm×150 mm to which a commercially-available rust-preventive oil had been applied on the lubricating coating film at a weight of 0.5 g/m² was placed for 30 days in a room which was exposed to the air.

4-3 Under exposure to moist atmosphere

After a commercially-available rust-preventive oil was applied at a weight of 0.5 g/m² to the lubricating coating film of a test piece having a size of 70 mm×150 mm, it was exposed to a moist atmosphere (97% relative humidity) at a temperature of 49°±1° C. in a moist box for 10 days.

The rust-preventing properties were evaluated by visually observing the degree of rusting on the lubricated surface of the test piece after the aging or exposure and rated as follows:

X: Significant rusting;
Δ: Slight rusting;
O: No rust.

The results of the above tests are summarized in Table 3 below.

TABLE 1

| | Monomer composition and properties of acrylic resins | | | | | | | | |
|---|---|---|---|---|---|---|---|---|---|
| No. of | Monomer (% by weight)[1] | | | | | | Properties[2] | | |
| acrylic resin | AA | MAA | MMA | OA | BA | EHMA | AV | Tg(°C.) | Mn |
| This Invention | | | | | | | | | |
| 1 | 8 | | 52 | 40 | | | 62 | 12 | 100,000 |
| 2 | 8 | | 52 | | 40 | | 62 | 20 | 100,000 |
| 3 | 8 | | 52 | | 30 | 10 | 62 | 34 | 50,000 |
| 4 | | 10 | 70 | | 20 | | 65 | 64 | 70,000 |
| 5 | 8 | | 52 | | | 40 | 62 | 83 | 30,000 |
| Comparative | | | | | | | | | |
| 6 | | 10 | 30 | | 60 | | 65 | −5* | 100,000 |
| 7 | | 2 | 48 | | 50 | | 13* | 5 | 100,000 |
| 8 | 22 | | 38 | | 40 | | 171* | 20 | 80,000 |
| 9 | 8 | | 92 | | | | 62 | 105* | 70,000 |

[1]AA: acrylic acid;
MAA: methacrylic acid;
MMA: methyl methacrylate;
OA: octyl acrylate;
BA: butyl acrylate;
EHMA: 2-ethylhexyl methacrylate.
[2]Tg: glass transition temperature (°C.);
Mn: number-average molecular weight.
*outside the range defined herein.

TABLE 2

| | Coating compositions (% by weight) | | |
|---|---|---|---|
| No. of composition | No. of acrylic resin | Water repellent[3] | Rust preventive[4] |
| Examples | | | |
| 1 | 1 | CaST | A |
| 2 | 2 | CaST | A |
| 3 | 3 | CaST | A |
| 4 | 4 | DOP | B |
| 5 | 5 | DOP | B |
| Comparative Examples | | | |
| 6 | 6* | DOP | B |
| 7 | 7* | CaST | A |
| 8 | 8* | CaST | A |
| 9 | 9* | CaST | A |
| 10 | 1 | —* | A |
| 11 | 1 | CaST | C* |
| 12 | 1 | CaST | —* |
| 13 | Rust preventive oil[5]* | | |

*outside the range defined herein.
[3]CaST: calcium stearate;
DOP: dioctyl phthalate.
[4]A: an equimolar mixture of allysulfonamide-acetic acid and morpholine:
B: an equimolar mixture of allysulfonamide-acetic acid and N—methylmorpholine;
C: an equimolar mixture of allysulfonamide-acetic acid and triethanolamine.
[5]Commercially available rust preventive oil.

TABLE 3

| | Test results of lubricated steel sheets | | | | | |
|---|---|---|---|---|---|---|
| No. of coating composition | Cupping drawability | Film removability | Anti-block properties | Rust-preventing properties | | |
| | | | | Stacked conditions | Exposure to air | Exposure to moist atm. |
| Examples | | | | | | |
| 1 | | | | | | |
| 2 | | | | | | |
| 3 | | | | | | |
| 4 | | | | | | |
| 5 | Δ | | | | | |
| Comparative Examples | | | | | | |
| 6 | | | X | | | |
| 7 | | X | X | Δ | | |
| 8 | | | | X | | |
| 9 | | X | | Δ | | |
| 10 | Δ | | | Δ | | |
| 11 | | | | X | | |
| 12 | | | | X | | |
| 13 | X | | | | | Δ |

As is apparent from Table 3, in Comparative Examples 6-9 in which an acrylic resin having an acid value or Tg which falls outside the range defined herein is used, at least one of the film removability, anti-block properties, and rust-preventing properties under stacked conditions of the lubricated steel sheets is deteriorated while satisfactory cupping drawability and rust-preventing properties under exposure to air or a moist atmosphere are maintained. Even in the cases where the acrylic resin has an acid value and Tg which fall within the ranges defined herein, if the rust preventive or water repellent is not added to the coating composition, the rust-preveting properties under stacked conditions are sigiificantly deteriorated (Comparative Examples 10 and 12).

In contrast, in the examples in which a coating composition according to the present invention is applied to a steel sheet, satisfactory results are obtained with respect to all the tested properties.

Although the invention has been described with respect to preferred embodiments, the invention is not to be construed as limited to the particular forms disclosed, since these are to be regarded as illustrating rather than restrictive. Variations and changes may be made by those skilled in the art without departing from the spirit of the invention.

What is claimed is:

1. A coating composition with improved rust-preventing properties suitable for use in preparing lubricated steel products, which comprises from 75 to 97.7% by weight of an acrylic resin having an acid value of from 20 to 160 and a glass transition temperature of from 5° to 100° C.; from 0.3 to 5% by weight of a rust preventive consisting of a mixture of a sulfonamidecarboxylic acid and a cyclic amine; and from 2 to 20% by weight of a water repellent, based on the total solids content of the composition.

2. A coating composition according to claim 1, wherein the water repellent is selected from carboxylic acid esters, metallic soaps, polyethylene fine powder, or fine powder of fluorinated resins.

3. A coating composition according to claim 1, wherein the acrylic resin has an acid value of from 40 to 120 and a glass transition temperature of from 10° to 85° C.

4. A coating composition according to claim 1, wherein the rust preventive is a mixture of a sulfonamidecarboxylic acid and a cyclic amine in which from 0.5 to 2.5 equivalent weights of the cyclic amine are present relative to each equivalent weight of the sulfonamidecarboxylic acid.

5. A coating composition according to claim 1 which comprises from 82 to 96.5% by weight of the acrylic resin, from 0.5 to 3% by weight of the rust preventive, and from 3 to 15% by weight of the water repellent.

* * * * *